Figure 1:
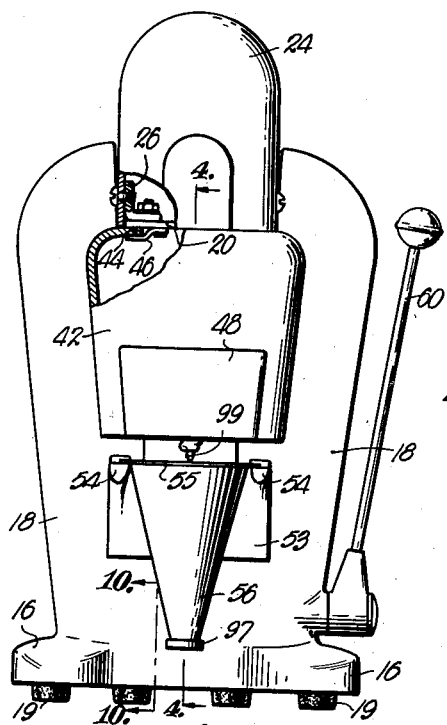

Jan. 20, 1953 C. A. REED 2,626,133
APPARATUS FOR PROCESSING FROZEN COMESTIBLES
Original Filed June 19, 1950 3 Sheets-Sheet 1

INVENTOR.
Claude A. Reed
BY
Thos. E. Scofield
ATTORNEY.

INVENTOR.
Claude A. Reed
BY
ATTORNEY.

Jan. 20, 1953 C. A. REED 2,626,133
APPARATUS FOR PROCESSING FROZEN COMESTIBLES
Original Filed June 19, 1950 3 Sheets-Sheet 3

INVENTOR.
Claude A. Reed
BY
ATTORNEY.

UNITED STATES PATENT OFFICE 2,626,133

APPARATUS FOR PROCESSING FROZEN COMESTIBLES

Claude A. Reed, Omaha, Nebr.

Original application June 19, 1950, Serial No. 168,974. Divided and this application November 24, 1950, Serial No. 197,387

21 Claims. (Cl. 259—44)

The present invention relates in general to apparatus for processing semi-solid frozen comestibles, particularly with a view to providing an improved confection somewhat similar in nature to freezer-fresh ice cream, sherbet, water ice or frozen custard.

This application is a division of my copending application Serial No. 168,974, filed June 19, 1950 which in turn was a continuation-in-part of my co-pending application Serial No. 49,339, filed September 15, 1948.

In the manufacture of commercial ice cream and the like, the product which leaves the freezer is soft, smooth, creamy and very palatable. It is not, however, in satisfactory condition for distribution from a central plant to dealers and consumers, nor for storage over more or less long periods before its ultimate consumption, so, for these and other reasons, it is conventional to transfer the fresh, frozen product to a hardening room maintained at a temperature considerably below the temperature of the freezer; there the liquids still remaining in the freezer-fresh product are solidified and crystallized, yielding the hard frozen ice cream, sherbet, etc., which finds its way to the dealer and the ultimate consumer.

In the judgment of most people who make the comparison, the hard frozen product is inferior to the freezer-fresh product in many regards, but it rarely is feasible to deliver freezer-fresh ice cream to the public for immediate consumption, because, for obvious practical and economic reasons, it ordinarily is impractical to carry out the freezing operation at the point of delivery of the product to the customer. With few exceptions, therefore, the public in general has been denied this superior product.

The present invention is directed to the foregoing problem, and its object, generally speaking, is to make practically available to the public a product which is not fresh frozen, but which nevertheless is very similar thereto, and, as a matter of fact, is equal or superior to the fresh frozen product in smoothness, creaminess, body, taste and aroma or bouquet. To the consumer, my product has an apparent temperature comparable to that of freezer-fresh ice cream, but actually it is considerably colder; it is, therefore, more cooling than freezer-fresh ice cream without being objectionably cold to the palate. While its temperature is in the range ordinarily confined to hard frozen ice cream, my product is soft and very plastic without being runny—it will stand and hold its shape in a dish, but may be dipped or spooned from the dish almost without effort.

More specifically, it is my aim to provide apparatus for treating a hard frozen product similar in physical characteristics to hard frozen ice cream, in such a fashion as to soften and plasticize it, make it smooth and creamy, and condition it to give an improved, very delightful taste sensation.

Another object of the invention is to provide apparatus for introducing flavoring ingredients into a hard frozen comestible after the base ingredients have been frozen and distributing them uniformly therethrough, without the necessity of re-freezing the mixture in order to serve it in a semi-solid state similar to that of freezer fresh ice cream.

Another object is to provide an apparatus which will permit the flavoring of a frozen confection at the last moment before serving, using not only conventional flavoring syrups and concentrates but also fresh whole fruit, berries, preserves, nuts, candy, ginger snaps, etc., in order to obtain a wider range of flavors than heretofore has been possible, it being understood that flavor of the latter ingredients is imparted to the frozen confection by the fine division and uniform dispersion of the ingredients throughout the final product.

The salient novelty of my invention resides in the provision of apparatus for pressurizing a hard, frozen comestible similar to hardened ice cream, and simultaneously subjecting it to mechanical action which plasticizes, kneads and vigorously re-mixes it, thus reducing the crystalline cell structure of the material so that, upon release of the pressure, the product is very soft, smooth, and creamy, yet only slightly less cold than the starting material. Preferably, the plasticizing and re-mixing are carried out by my apparatus in conjunction with a macerating or mincing action which not only aids in breaking up the hard comestible, but also in case a hard flavoring material (e. g. peanut brittle) is added, insures that the latter also is chopped and broken up into finely divided state for dispersion uniformly throughout the resultant mass. Further, I find it beneficial to vary the pressure on the comestible during treatment and prefer to subject it to a homogenizing action in connection with a stirring or whipping action in order to obtain maximum smoothness of texture and uniformity of mixture.

An important object of the invention, of course, is to provide apparatus suitable for carrying out the process embodied by my concept.

Other and further objects, together with the features of novelty by which the objects are achieved, will appear in the course of the following description of the invention.

Figure 3:
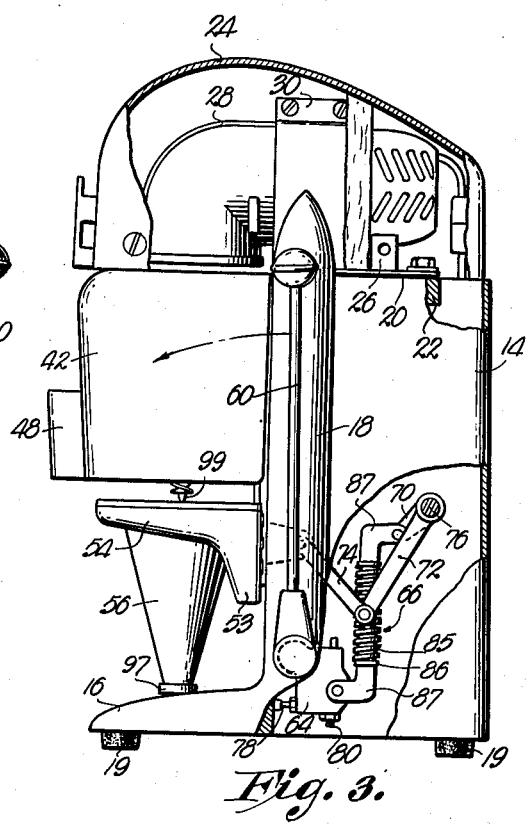
Figure 2:
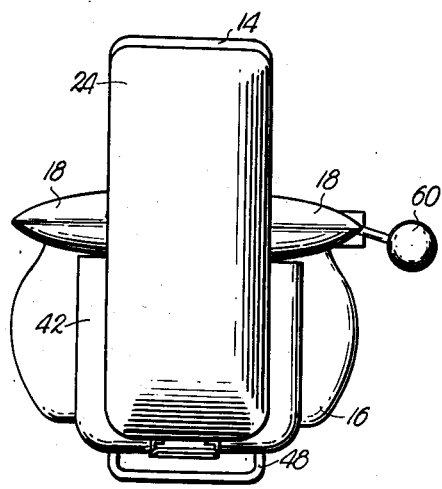
Figure 10:
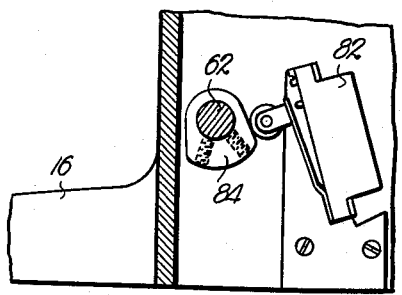
Figure 4:
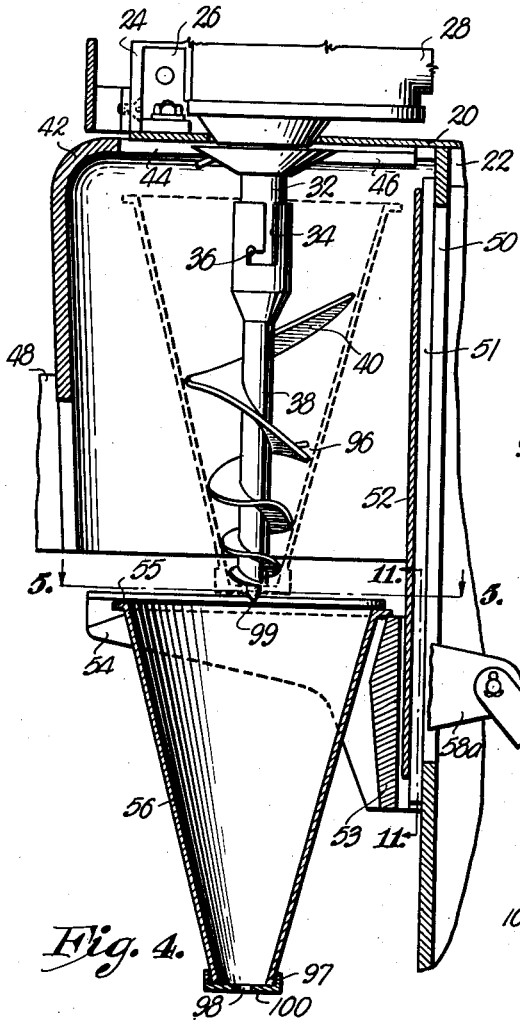
Figure 6:
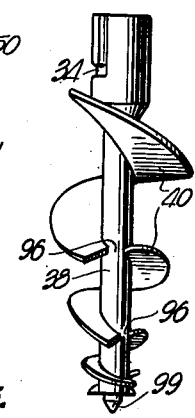
Figure 8:
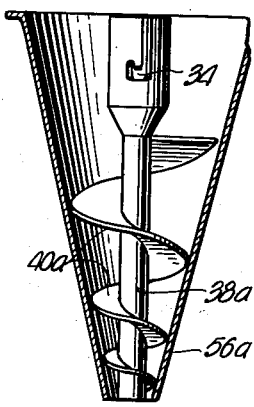
Figure 7:
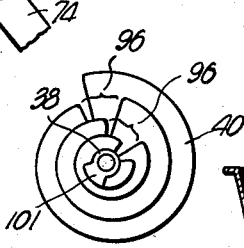
Figure 9:
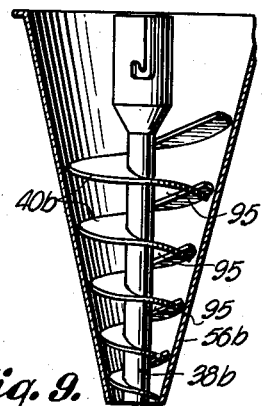
Figure 5:
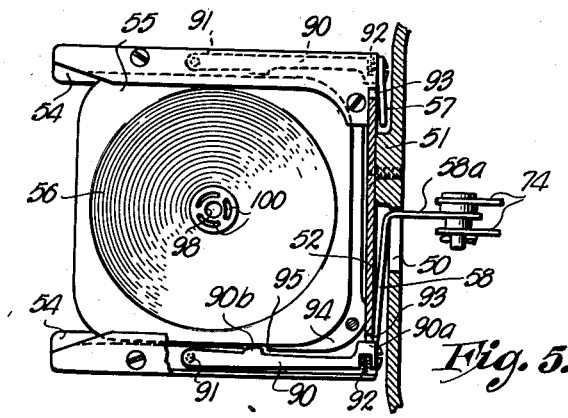
Figure 12:
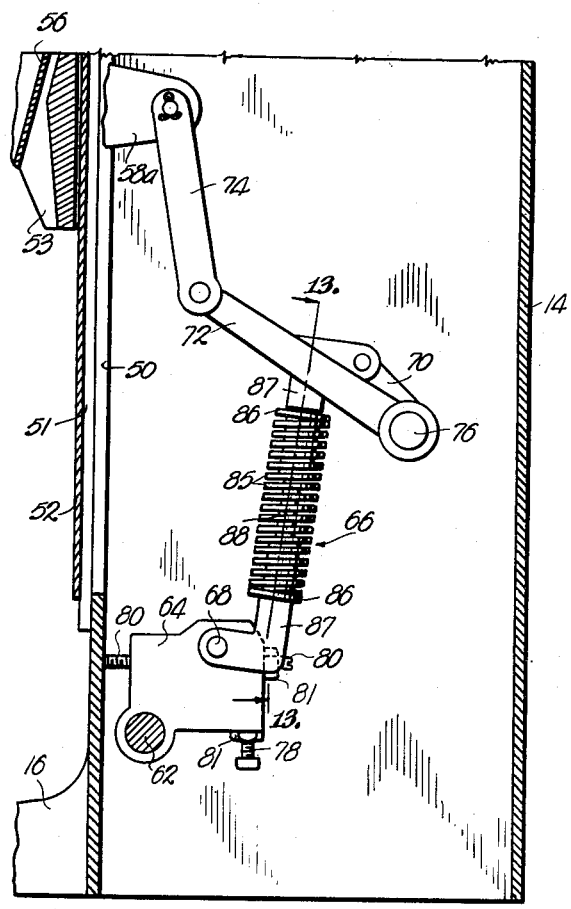
Figure 13:
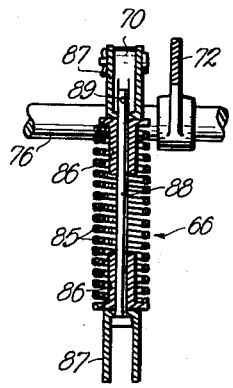
Figure 11:
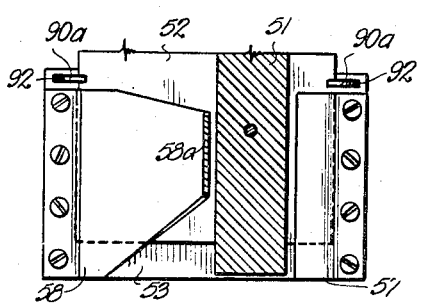

In the accompanying drawings which form a part of the specification and are to be read in conjunction therewith, and in which like reference numerals are employed to indicate like parts of the various views:

Fig. 1 is a front elevational view of the machine I prefer to employ in carrying out my method, parts thereof having been cut away for purposes of illustration. While the method may be performed by other apparatus, this machine is particularly well suited thereto, and, as a matter of fact, was originated by me for this special purpose, Fig. 2 is a plan view of my machine, Fig. 3 is a side elevational view of my machine with parts cut away for purposes of illustration, Fig. 4 is an enlarged vertical cross section of the forward part of the machine taken along the line 4—4 of Fig. 1 in the direction of the arrows, Fig. 5 is a horizontal sectional elevation taken along the line 5—5 of Fig. 4 in the direction of the arrows, parts having been broken away for purposes of illustration, Fig. 6 is an elevational view of the auger employed in my machine, showing same turned about its axis approximately 90° from the position in which it is shown in Fig. 4, Fig. 7 is a bottom elevational view of the auger, Figs. 8 and 9 are elevational views of modified forms of augers, each being shown in a tapered cup or hopper of slightly different construction than the cut shown in Fig. 4, Fig. 10 is an enlarged cross section taken along the line 10—10 of Fig. 1 in the direction of the arrows, Fig. 11 is an enlarged cross section taken along the line 11—11 of Fig. 4 in the direction of the arrows, Fig. 12 is a cross sectional view taken along the same plane as Fig. 4, but showing the mechanism operated to elevate the tapered cup, and Fig. 13 is a cross section taken along the line 13—13 of Fig. 12 in the direction of the arrows.

Referring more particularly to the drawings, my machine has a base or housing comprising a hollow rear column or pedestal 14 with a pair of forwardly extending laterally spaced horizontal legs 16; at their rearmost extremities, the legs merge with vertically disposed hollow wings 18 forming part of the side walls of the pedestal. The machine rests on rubber feet or bumpers 19 affixed to the under side of the legs and pedestal.

At the top of the pedestal, a mounting plate 20 is bolted to lugs 22 on the inside of the housing, and removable cover or head 24 is secured by screws to brackets 26 carried on the mounting plate. The upper ends of the hollow wings 18 register with openings in the side walls of the cover 24 to form ventilating ducts extending downwardly on either side of the mounting plate.

Within the head 24, a motor 28 is secured to the mounting plate by a clamping sleeve or bracket 30. The forward portion of the motor housing is elbow shaped and contains suitable speed reduction gearing (e. g. a worm drive, not shown) through which the downwardly extending vertical shaft 32 is driven. Detachably mounted on this shaft by means of a slotted socket 34 and bayonet pin 36 is an extension shaft 38 carrying a tapered auger 40 which presently will be described more in detail.

Around the auger is a shroud 42. This is open on the bottom and on the back, and has a U-shaped cut-out on the top forming lateral edges 44 adapted to be received between the mounting plate 20 and offset horizontal track members 46 fastened to the underside of the mounting plate. A handle 48 is provided on the front of the shroud whereby the shroud can be drawn along the track members away from the front of the vertical pedestal or column 14; thus the shroud can be removed to gain access to the auger for cleaning purposes or the like, after which it may be restored to the position shown by inserting the rearmost extremities of the lips 44 back in the track members and pushing the shroud rearwardly until it bumps against the pedestal.

In the front face of the pedestal or housing is a vertical slot 50 with a boss 51 running longitudinally along one side thereof. A plate 52 secured to the boss by screws or otherwise covers the slot and forms a track for a vertically slidable carriage or cup holder 53. The latter has a pair of laterally spaced horizontal arms 54 which are grooved to receive the upper flange 55 of a tapered cup or hopper 56, whereby the cup is positioned in axial alignment with the auger.

The carriage is recessed on its rear side to receive the front face of the track and has secured to its lateral edges by screws a pair of retaining flanges 57 and 58 which extend inwardly behind the track to slidably support the carriage on the track. Flange 58 has an ear 58a turned rearwardly to project through a slot 50 into the interior of the pedestal where it connects to the mechanism for raising and lowering the carriage, now to be described.

Referring particularly to Figs. 3 and 12, a handle or lever 60 on one side of the pedestal is connected to a transverse shaft 62 mounted in suitable bearings in the pedestal so that movement of the handle forwardly and downwardly, as indicated by the arrow in Fig. 3, turns the shaft in a counter-clockwise direction. Secured on the shaft to turn therewith is a block 64 which in turn has one end of a spring link 66 connected thereto by a pivot pin 68. The other end of the link is connected to arm 70 of the bell crank whose second arm 72 is connected by link 74 to the ear 58a extending rearwardly from the carriage.

Movement of the handle 60 forwardly and downwardly from its Fig. 1 position turns shaft 62 and block 64 counter-clockwise as previously explained, whereupon link 66 causes the bell crank to turn clockwise about the axis of its shaft 76, and consequently raises the carriage along track 54, the final position of parts being as indicated in Fig. 12, and the position of the cup then being as indicated by dotted lines in Fig. 4; rotation of the handle 60 back to its upright position reverses the movement of the parts lowering the carriage to the position shown by solid lines in Figs. 1, 3 and 4.

The stroke of the handle or operating lever 60 (and hence the travel of the carriage) is limited by a pair of adjustable stop screws 78 and 80 received in tapped holes in the block 64. Screw 78 halts the downward movement of the carriage when its head strikes the forward wall of the pedestal as shown in Fig. 3, while screw 80 halts the upward movement of the carriage when its end strikes the pedestal wall as shown in Fig. 12. Both screws are conveniently accessible for adjustment through the open bottom of the pedestal and each is provided with a lock nut 81 to secure it in adjusted position.

The motor 28 is turned off and on by a switch 82 (see Fig. 10) which is operated by a cam mounted on the shaft 62. In the position of the cam illustrated, (i. e., when handle 60 is upright) the switch is open and the motor consequently is at rest. However, when the shaft turns counter-clockwise responsive to handle 60 being swung down to raise the tapered cup, cam 84 closes the switch causing the motor to run during the ascension of the cup and until handle 60 again is restored to its normal upright position whereupon switch 82 again opens and automatically halts the motor.

Referring to Fig. 13, it will be seen that the spring link 66 comprises a stiff helical compression spring 85 having at its opposite ends a pair of centering shoulder-bushings 86 and a pair of clevises 87, the entire assembly being held together by a rod 88 having a head in one clevis and a pin 89 in the other. Upon rotation of shaft 62 and block 64 in a counter-clockwise direction (Figs. 3 and 12) the upward thrust applied to the lower clevis 87 is transmitted through the spring 85 to the upper clevis 87 and thence to arm 70 of the bell crank. If there is any undue resistance to the ascension of the cup, as will be explained in more detail presently, the spring compresses during this operation to relieve the parts from stress that might otherwise be injurious.

As previously indicated, cup 56 is supported on carriage 53 by means of its flange 55, the opposite edges of which are received in opposed horizontal grooves in the arms 54. When the carriage is in its lowermost position, the cup may, of course, be removed therefrom simply by drawing it forward to slide its flange out of said grooves. Referring to Fig. 5, it will be seen that when this is done, the laterally spaced flat arms 90, pivoted at 91, swing toward one another under the influence of springs 92, so that the integral dogs or detents 90a at their free ends enter notches 93 on either side of track 52 (see Fig. 11) and lock the carriage against vertical movement.

The dogs register with these notches only when the carriage is in its lowermost position, it being understood that the lower limit of the carriage's travel can be adjusted by stop screw 78 in order to produce proper registration of the two. Thus, when cup 56 is not positioned in the carriage, it is impossible to elevate the latter from its lowermost position, or to move handle 60 far enough forward to actuate switch 82 and start the motor, this feature being an effective safeguard against carelessness on the part of the operator.

Arms 90 are concealed in recesses 94 in the carriage arms, but have ears 90b positioned to extend through apertures 95 into the grooves which receive the flange of cup 56. Accordingly, upon insertion of the cup into the carriage, its flange engages the ears forcing arms 90 outwardly and disengaging the dogs from the notches so the carriage is free to move up and down as described hereinbefore.

Figs. 8 and 9 show modified forms of augers and cups, and it will be convenient first to explain the operation of my machine and my method of processing frozen comestibles in connection with the auger and cup of Fig. 8. Here it will be seen the convolutions 40a form an unbroken spiral around the straight central stem 38a. However, the profile of the auger tapers to conform with the taper of the cup 56a (i. e., the convolutions become progressively smaller in outside diameter from top to bottom of the auger) and it will be noted also that the vertical spacing between successive convolutions or flights of the auger likewise diminishes from top to bottom.

When the auger of Fig. 8 is mounted on the drive shaft 32, and the cup 56a is positioned in the carriage, the upward travel of the carriage is limited by proper adjustment of stop screw 80 so that all points along the spiral margin of the auger just touch the inside wall of the cup, the engagement between the two being sufficiently light, however, as to produce no material frictional drag on the auger as it rotates. By its engagement therewith, it will be seen that the auger forms with the interior of the cup a spiral passageway whose cross sectional area diminishes in a downward direction. The auger convolutions are imperforate, so with good engagement between the margin of the auger and the cup, this passageway is substantially closed on its sides (i. e., there is in effect a closed annulus circumscribing the spiraling axis of the passageway at all points along such axis) but the passageway is, of course, open at its large upper end and at its small lower end.

In using my machine, the cup 56a is removed from the carriage and the hard frozen comestible to be treated is introduced therein. This comestible comprises a special mix which has been frozen and hardened similarly to conventional hard frozen ice cream, and which is kept on storage so that it may be processed in accordance with the present invention just prior to delivery to the consumer. Conveniently, therefore, the hard frozen product may be prepared in a central plant and transported to outlying retail establishments where the final processing is carried out upon receipt of the customer's order. While awaiting the final processing, the comestible preferably is maintained at a temperature of −20° F. to +12° F. and it is at this temperature that it is introduced into cup 56a.

The cup then is inserted into the arms of carriage 53 and handle 60 is pulled forwardly and downwardly to lift the cup to its uppermost position. As the cup begins to ascend, motor 28 also starts turning the auger which therefore subjects the material in the cup to a vigorous preliminary breaking and stirring action as the auger becomes buried therein. If the material is very hard, it will, of course, resist the advance of the auger to a substantial degree, but the operator nevertheless can swing handle 60 down to the limit of its stroke as determined by stop screw 80; in so doing he compresses spring 85 which, after the handle has been halted by screw 80, continues to urge cup 56a upwardly so that it ascends to its final position (Fig. 8) as fast as it can make way against the resistance imposed by the material in the cup.

Rotation of the auger is in such a direction as to drive the comestible downwardly in the cup, and a suitable receptacle is positioned below the open lower end thereof to receive the material extruded. Ordinarily a small amount is extruded through the small bottom opening before the edges of the auger become seated against the inside wall of the cup; the major portion, however, still is within the cup at this time, and hence is confined in the aforementioned spiral passageway. As rotation of the auger continues, the material is forced downwardly along the tortuous course formed by the passageway (which it will be understood is constantly changing its position and aspect relative the material, at a high rate of speed) the material being confined more and more closely as it progresses, due to the diminishing cross sectional area of the passageway, whereby the material between the lower flights of the auger is under greater pressure than that between the upper flights. At any particular point in the auger the material is subjected simultaneously to forces tending to drive it ahead in the passageway toward a zone of smaller cross section and also to forces tending to move it circumferentially with the auger; this results in a macerating and kneading action which sets up in the material complex intercellular stresses of shear and compression. Inevitably there also is some escape of the material past the outer margin of the auger from the lower zones of higher pressure to the upper zones of lower pressure, this feed back of the material through the very restricted clearance about the margin of the convolutions being believed to assume explosive proportions as the material undergoes the rapid pressure release incident to its passage between said zones.

The action which takes place thus is the result of a number of varying factors too complex to permit accurate analysis, and, while I therefore do not wish to be limited to any particular theory of operation, it is my belief that the effect of the varying pressures on the melting point of the frozen comestible, coupled with the intercellular stresses set up by the character of the mechanical agitation to which it is subjected, are in a large way responsible for the complete alteration of its physical properties. In any event, the product which is extruded through the restricted orifice at the bottom of the cup is soft and creamy without the slightest trace of sandiness or objectionable crystals; it is exceedingly fine in texture as compared with the hard starting material, has a light yet satisfying body and is almost completely free of occluded air as far as I have been able to determine.

On the average, the final product is about eight degrees warmer than the starting material (it may vary from —10° F. to +18° F. depending upon the temperature of the starting material) and while thus considerably colder than freezer-fresh ice cream or the like, its apparent temperature to the consumer is comparable to freezer-fresh ice cream of 17° F. to 25° F. It is not, in other words, objectionably cold to the palate, yet actually is more cooling than freezer-fresh ice cream. The reason for this is not fully understood, but appears to be due to a difference between the cell structure of the two materials. Another feature of my product, which is of such great practical importance that it cannot be over-emphasized, is its very remarkable cleanness and freshness of taste, a characteristic apparently achieved as the result of a unique release of the flavoring and aromatic ingredients present in the hard frozen starting material.

It is very convenient to introduce into the cup with the starting material, any of the wide range of syrups or other flavoring ingredients, and if this is done, the flavor is distributed uniformly in the product. I have discovered also that introduction of the flavor in this fashion, just prior to serving so that the flavoring constituents do not undergo the freezing and hardening operations to which they are subjected in conventional ice cream manufacture, nor the attendant more or less prolonged storage in frozen condition, brings about an improvement in the taste and bouquet of the product so exceptional that the results are beyond comparison with frozen products flavored by the old methods.

With the foregoing discussion in mind, reference now is made to the modified form of auger shown in Fig. 9, which I find to have certain additional advantages. The chief difference between this auger and the one shown in Fig. 8 is that the convolutions 40b do not form a continuous spiral about the central stem, but rather are a succession of broken flights. Each flight extends once around the stem and conveniently is made from a flat, approximately disk-shaped stamping which, as more fully explained in my prior application, is split radially and twisted by bending the portions on opposite sides of the split apart as shown, then welding the unit on the central stem. The leading edge of each flight confronts the trailing edge of the next larger flight, the two edges overlapping somewhat at their outer tips.

Each pair of adjacent flights form with the cup 56b a spiral passageway extending once around the stem 38b, and, considering the material discharged from the end of one of these passageways, it will be noted that part of the material is fed into the next passageway while a part is fed back to the beginning of the same passageway already traveled, through one of the openings shown at 95. The leading edge of each flight functions as a knife blade effecting repeated subdivisions of the comestible, and recycling of portions thereof, so it is thoroughly macerated, kneaded and remixed, while at the same time it is subjected to increasing compression and the other forces described hereinbefore. The mixing achieved by this auger is somewhat more thorough than that achieved by an auger having an unbroken spiral flight, and in case of the addition of hard substances for flavoring (e. g., hard candy, nuts, cookies, etc.) the cutting and breaking action performed by the leading edge of each broken flight insures complete reduction of the flavoring material to exceedingly fine particles which are uniformly mixed and distributed through the final product.

Attention now is directed to the auger and cup shown in Figs. 4 to 7, which have still further advantages and comprise my preferred arrangement. Here again it will be seen that a broken flight auger is employed, but in this case the confronting leading and trailing edges of successive flights are so oriented that there are no feedback openings comparable to openings 95 in Fig. 9. The action of this auger therefore is quite similar to that shown in Fig. 8 except that the openings 96 between successive convolutions provide definite communication between zones of higher and lower pressure; in other words, as the material is forced downwardly and is subjected to progressively increasing pressure, the pressure is relieved in region of openings 96, such relief occurring sharply and repeatedly with respect to compacted material at any point in the cup as the auger turns at high speed relative thereto. The general tendency of the material to progress toward higher pressure therefore is modified by repeated momentary pressure reductions occurring at high frequency, these being accompanied by some feed-back of the material through openings 96 from the zone of higher pressure below a given auger flight to the zone of lower pressure above that flight. The momentary pressure reductions are believed to be of explosive character, and in any event, appear clearly to play an important part in subjecting the material to violent internal stresses of varying magnitude and direction, leading to a complete breaking down of the crystalline structure of the mass and excellent homogeneity of the product.

Cup 56 also is provided on the bottom with a cap 97 having therein a central opening 98 adapted to receive a centering tip 99 on the auger; around this opening are three circumferentially spaced orifices 100 through which the material is extruded. On the bottom of the auger is a flattened surface 101 which rides flush against the inside of the cap when the cup is elevated, serving as a valve to close orifices 100 in succession as the auger turns. The effective total orifice area varies from moment to moment (being smallest when the valve surface 101 is directly over one of the orifices 100 and greatest when it is between adjacent ones of the orifices) and this brings about a high speed pulsating variation in the back pressure produced on the material at the extrusion outlet.

The speed of the auger may vary over a comparatively wide range, but I prefer its average speed to be in the neighborhood of 500 to 600 R. P. M. which I find yields very satisfactory results. At this speed, the pulsations in back pressure occur at a rate of 1500 to 1800 cycles per minute. The load on the motor is, of course, greatest (and its speed accordingly the lowest) about the time that the tapered cup initially reaches its uppermost position, since the auger then is almost fully buried in material which still is quite hard; as the material becomes softer and more and more of it is extruded, the load decreases, and the speed of the auger naturally increases. In practice, the speed may drop as low as 100 R. P. M. on full load and go as high as 1200 R. P. M. at, or approaching, no load without any material sacrifice in the quality of the product. Within this range it will be evident that the rate of pulsation of the back pressure is 300 to 3600 cycles per minute.

The average effective size of the hopper outlet in Figs. 4 and 5 is somewhat smaller than the aggregate cross sectional area of the spiral passageway in which the material is confined at the bottom of the tapered cup, and it will be seen that the lowermost flights of the auger operate in very close proximity to the aperture plate; these factors, together with the arrangement for developing pulsations in the back pressure, make the final pressure-stressing and mechanical agitation of the material exceedingly forceful and effective, and the product which issues from the orifices is uniformly creamy, soft, well mixed and beaten, flowable to a degree, but not wet or runny. If liquid flavoring ingredients have been introduced into the cup with the hard frozen starting material, they now are blended homogeneously therethrough, the final product being completely free of color streaks or stratification of any kind; if solid or semi-solid flavoring ingredients were added, these now are so finely divided and so uniformly distributed through the product that they are discernible, if at all, only as very minute specks.

In the case of all of the augers shown and described, it will be understood that by virtue of their engagement with the interior of the cup they wipe the cup almost dry, leaving it so clean after its use that it may be re-used immediately with other flavors without any "carry over" of the flavor from one operation to the next.

Thus it is evident that I have provided an apparatus for completely altering the character of a hard frozen comestible by controlled pressure treatment in conjunction with a stirring, beating, mincing and macerating action, the final product being soft, smooth and creamy and having excellent body, taste and aroma or bouquet. I have also provided an apparatus for introducing into a product of this character at the last moment before serving any of an exceptionally wide range of flavoring ingredients, with the result that because the flavors have not undergone freezing, hardening and storage, they have a remarkably fresh and clean taste not heretofore achieved.

From the foregoing it will be seen that this invention is one well adapted to attain all of the ends and objects hereinbefore set forth together with other advantages which are obvious and which are inherent to my method and apparatus.

It will be understood that certain features and sub-combinations are of utility and may be employed without reference to other features and sub-combinations. This is contemplated by and is within the scope of the claims.

Inasmuch as many possible embodiments of the invention may be made without departing from the scope thereof, it is to be understood that all matter herein set forth or shown in the accompanying drawings is to be interpreted as illustrative and not in a limiting sense.

I claim:

1. Apparatus of the character described, comprising a tapered auger, means rotatably supporting said auger with its axis upright and its small end down, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into the said hopper, said auger and hopper conforming to one another in contour whereby substantially the entire margin of the auger engages the interior of the hopper when the auger is fully inserted therein, and means for rotating said auger in a direction to advance material in said hopper downwardly toward said bottom opening.

2. Apparatus of the character described, comprising a tapered auger, means rotatably supporting said auger with its axis upright and its small end down, a prime mover connected to said auger for driving same, an open top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into said hopper, means controlled by said mechanism for initiating the operation of said prime mover upon such movement, and said auger and hopper conforming to one another in contour whereby substantially the entire margin of the auger engages the interior of the hopper when the auger is fully inserted therein.

3. Apparatus of the character described, comprising a tapered auger, means rotatably supporting said auger with its axis upright and its small end down, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into said hopper, said mechanism including a stop to limit the distance the auger is introduced into said hopper, said auger and hopper shaped so the exterior profile of the former complements the interior profile of the latter, the two being in close adjacency when the auger is introduced in the hopper the full amount permitted by said stop, and means for rotating said auger in a direction to advance material in said hopper downwardly toward said bottom opening.

4. Apparatus as in claim 3 wherein said stop is adjustable to vary the distance said auger is introduced into said hopper.

5. Apparatus of the character described, comprising a tapered auger, means rotatably supporting said auger with its axis upright and its small end down, a prime mover connected to said auger for driving same, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into said hopper, said mechanism including a stop to limit the distance the auger is introduced into said hopper, said auger and hopper shaped so the exterior profile of the former complements the interior profile of the latter, the two being in close adjacency when the auger is introduced in the hopper the full amount permitted by said stop, and means controlled by said mechanism for initiating the operation of said prime mover substantially simultaneously with the beginning of the introduction of said auger into said hopper.

6. Apparatus of the character described, comprising a tapered auger, means rotatably supporting said auger with its axis upright and its small end down, an open-top hopper having circular downwardly converging side walls communicating with a restricted opening of the bottom of the hopper, means supporting the hopper below the auger in axial alignment therewith, a manual operating handle having a normal position and movable to an off-normal position, a stop to halt said handle when it reaches said off-normal position, linkage between said handle and one of said support means for moving the latter toward said other support means when said handle is moved to said off-normal position thereby to introduce said auger into said hopper, means in said linkage providing a lost motion between said handle and the support means moved thereby, a spring in said lost motion means yieldably resisting the loss of motion therein, said auger and hopper conforming to one another in contour whereby substantially the entire margin of the auger engages the interior of the hopper when the auger is fully inserted therein, and means for rotating said auger in a direction to advance material in the hopper downwardly toward said bottom opening.

7. Apparatus of the character described, comprising a tapered auger, means rotatably supporting said auger with its axis upright and its small end down, a prime mover connected to said auger for driving same, an open-top hopper having circular downwardly converging side walls communicating with a restricted opening in the bottom of the hopper, means supporting the hopper below the auger in axial alignment therewith, a manual operating handle having a normal position and movable off normal to a second position, a stop to halt said handle when it reaches said second position, linkage between said handle and one of said support means for moving the latter toward the other support means when the handle is moved from said normal position to said second position, thereby to introduce said auger into said hopper, means in said linkage providing a lost motion between said handle and the support means moved thereby, a spring in said lost motion means yieldably resisting the loss of motion therein, said auger and hopper conforming to one another in contour whereby substantially the entire margin of the auger engages the interior of the hopper when the auger is fully inserted therein, and means controlled by said handle for initiating the operation of the prime mover upon movement of the handle off normal.

8. Apparatus of the character described, comprising a tapered auger, means rotatably supporting said auger with its axis upright and its small end down, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into the said hopper, said auger and hopper conforming to one another in contour whereby substantially the entire margin of the auger engages the interior of the hopper when the auger is fully inserted therein, means for rotating said auger in a direction to advance material in said hopper downwardly toward said restricted bottom opening, and a valve element on said auger registering with said restricted opening and rotating with said auger to alternately open and close said opening.

9. Apparatus of the character described, comprising a tapered auger, means rotatably supporting said auger with its axis upright and its small end down, an open-top hopper having circular downwardly converging side walls and a bottom containing a plurality of restricted openings arranged in a circle, means supporting said hopper below the auger in axial alignment therewith, mechanism connected to one of said support means for moving same toward the other support means thereby to introduce said auger into said hopper, said auger and hopper conforming to one another in contour whereby substantially the entire margin of the auger engages the interior of the hopper when the auger is fully inserted therein, means for rotating said auger in a direction to advance material in the hopper downwardly toward said restricted bottom opening, and a valve element on said auger registering with said circle of restricted openings and rotating with said auger to cover and close said openings sequentially.

10. Apparatus of the character described, comprising a base, a tapered auger rotatably mounted on said base with its axis vertical and its small end down, means for rotating said auger about its axis, a carriage movably mounted on said base and normally positioned below said auger, an open-top hopper having circular downwardly converging side walls communicating with a restricted opening of the bottom of the hopper means for detachably mounting said hopper on said carriage in vertical alignment with said auger, mechanism for elevating said carriage to introduce said auger into said hopper, said auger and hopper conforming to one another in contour whereby substantially the entire margin of the auger engages the interior of the hopper when the auger is fully inserted therein.

11. Apparatus as in claim 10 having means controlled by said hopper for locking said carriage against movement from said normal position whenever the hopper is detached from said carriage.

12. Apparatus of the character described, comprising a base having an upright track, a carriage supported on said track for vertical movement therealong between predetermined high and low positions, a stop on said track, a detent on said carriage normally cooperating with said stop when said carriage is in its low position to prevent elevation of the carriage, a cup removably mountable on said carriage, means actuated by the cup when the same is mounted on the carriage to shift said detent clear of said stop, mechanism for then elevating said carriage to its high position, a rotary device above the carriage supported on said base in a position to enter said cup when the carriage is elevated to its high position, a prime mover connected to said device, and means controlled by said mechanism for automatically initiating the operation of said prime mover upon movement of said carriage to its high position.

13. Apparatus of the character described, comprising a base having an upright track, a carriage supported on said track for vertical movement therealong between predetermined high and low positions, a stop on said track, a detent on said carriage normally cooperating with said stop when said carriage is in its low position to prevent elevation of the carriage, a cup removably mountable on said carriage, means actuated by the cup when same is mounted on the carriage to shift said detent clear of said stop thereby to permit elevation of the carriage to its high position, and a power operated rotary device above the carriage, said device supported on said base in a position to enter said cup when the carriage is elevated to its high position.

14. Apparatus of the character described comprising a base having an upright track, a carriage supported on said track for vertical movement therealong between predetermined high and low positions, a stop on said track, a detent on said carriage normally cooperating with said stop when said carriage is in its low position to prevent elevation of the carriage, said carriage having a pair of laterally spaced horizontal arms containing longitudinal grooves along their confronting inner faces, a cup having a flanged rim slidably insertable in said grooves to support the cup on said carriage, means operatively connected to said detent and engaged by the flange of said cup upon such insertion to shift said detent clear of said stop thereby to permit elevation of the carriage to its high position, and a power operated rotary device above the carriage, said device supported on said base in the position to enter said cup when the carriage is elevated to its high position.

15. Apparatus of the character described comprising a tapered auger, means rotatably supporting said auger with its axis upright and its small end down, each convolution of said auger except the end convolutions being spaced farther from the convolution above than it is from the convolution below, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into the hopper, said auger and hopper conforming to one another in contour whereby substantially the entire margin of the auger engages the interior of the hopper when the auger is fully inserted therein, and means for rotating said auger in a direction to advance material in said hopper downwardly toward said bottom opening.

16. Apparatus of the character described comprising a tapered, broken flight auger, each flight of said auger being substantially imperforate but said auger having apertures between adjacent flights, means rotatably supporting said auger with its axis upright and its small end down, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into said hopper, said auger and hopper conforming to one another in contour whereby substantially the entire margin of the auger engages the interior of the hopper when the auger is fully inserted therein, and means for rotating said auger in a direction to advance material in said hopper toward said bottom opening.

17. Apparatus of the character described comprising a tapered, broken flight auger, each flight of said auger being substantially imperforate but said auger having apertures between successive flights, means rotatably supporting said auger with its axis upright and its small end down, each convolution of said auger except the end convolutions being spaced farther from the convolution above than it is from the convolution below, an open-top hopper having circular downwardly converging side walls communicating with a restricted opening in the bottom of the hopper, means supporting said hopper below the auger in axial alignment therewith, mechanism connected to one of said support means for moving same toward the other support means thereby to introduce said auger into said hopper, said auger and hopper conforming to one another in contour whereby substantially the entire margin of the auger engages the interior of the hopper when the auger is fully inserted therein, and means for rotating said auger in a direction to advance material in said hopper downwardly toward said bottom opening.

18. Apparatus for softening and plasticizing a hard, pre-frozen comestible, comprising a circular tube open at one end for receiving the comestible to be treated and having a restricted orifice in the other end, an auger in the tube, means for rotating said auger to advance the comestible through the tube toward said orifice, the entire margin of the auger being in substantial engagement with the interior of the tube whereby the auger forms with the tube a spiral passageway through which the comestible advances, said auger and tube constructed and shaped so said passageway diminishes in cross sectional area in the direction of the movement of the comestible, and closure means on the auger at said other end of the tube rotating with the auger to alternately open and close said orifice.

19. Apparatus for softening and plasticizing a hard, pre-frozen comestible, comprising a circular tube open at one end for receiving the comestible to be treated and having at the other end a series of restricted orifices arranged in a circle about the axis of the tube, an auger in the tube, means for rotating said auger to advance the comestible through the tube toward said orifices, the entire margin of the auger being in substantial engagement with the interior of the tube whereby the auger forms with the tube a spiral passageway through which the comestible advances, said auger and tube constructed and shaped so said passageway diminishes in cross sectional area in the direction of the movement of the comestible, and closure means on the auger at said other end of the tube registering with said circle of orifices, said closure means rotating with said auger to cover and close said orifices in cyclic succession.

20. Apparatus for softening and plasticizing a hard, pre-frozen comestible, comprising a circular tube open at one end for receiving the comestible to be treated and having a restricted orifice in the other end, an auger in the tube, means for rotating said auger to advance the comestible through the tube toward said orifice, and closure means on said auger at said other end of the tube, said closure means rotating with the auger to alternately open and close said orifice.

21. Apparatus for softening and plasticizing a hard, pre-frozen comestible, comprising a circular tube open at one end for receiving the comestible to be treated and having at the other end a series of restricted orifices arranged in a circle about the axis of the tube, an auger in the tube, means for rotating said auger to advance the comestible through the tube toward said orifices, and closure means on the auger at said other end of the tube registering with said circle of orifices, said closure means rotating with said auger to cover and close said orifices in cyclic succession.

CLAUDE A. REED.

REFERENCES CITED

The following references are of record in the file of this patent:

UNITED STATES PATENTS

| Number | Name | Date |
| --- | --- | --- |
| 505,975 | Fate | Oct. 3, 1893 |
| 572,455 | Sigmund | Dec. 1, 1896 |
| 902,088 | Kintner | Oct. 27, 1908 |
| 1,458,492 | Mathews et al. | June 12, 1923 |
| 1,507,516 | Richardson | Sept. 2, 1924 |
| 1,889,381 | Rush | Nov. 29, 1932 |
| 2,088,336 | Neitzke | July 27, 1937 |
| 2,222,601 | Blish et al. | Nov. 26, 1940 |
| 2,415,585 | Genova | Feb. 11, 1947 |
| 2,463,697 | Kipper | Mar. 8, 1949 |